United States Patent [19]

Smith et al.

[11] Patent Number: 4,594,362
[45] Date of Patent: Jun. 10, 1986

[54] FRIABLE FOAM TEXTILE CLEANING STICK

[75] Inventors: James A. Smith, Old Tappan; Betty J. Murphy, Upper Montclair, both of N.J.

[73] Assignee: Creative Products Resource Associates, Ltd., Clifton, N.J.

[21] Appl. No.: 793,166

[22] Filed: Oct. 31, 1985

Related U.S. Application Data

[63] Continuation-in-part of Ser. No. 684,384, Dec. 20, 1984, Pat. No. 4,548,954, and a continuation-in-part of Ser. No. 684,746, Dec. 20, 1984, each is a continuation-in-part of Ser. No. 511,185, Jul. 6, 1983, Pat. No. 4,563,483.

[51] Int. Cl.⁴ ............................................. C08J 9/38
[52] U.S. Cl. .................................. 521/52; 134/40; 210/924; 252/90; 252/91; 252/174; 252/DIG. 2; 521/76; 521/91; 521/110; 521/111; 521/122; 521/123; 521/159; 521/905; 521/918
[58] Field of Search ............... 521/52, 111, 76, 122, 521/123, 159, 905, 918; 210/924; 252/90, 91, 174

[56] References Cited

U.S. PATENT DOCUMENTS

| | | | |
|---|---|---|---|
| 2,789,953 | 4/1957 | Blackman | 252/88 |
| 3,088,158 | 5/1963 | Boyle et al. | 15/506 |
| 3,533,953 | 10/1970 | Mills et al. | 252/88 |
| 4,066,394 | 12/1974 | Leonard | 8/137 |
| 4,127,515 | 11/1978 | McRae et al. | 521/112 |
| 4,137,200 | 1/1979 | Wood et al. | 521/159 |
| 4,271,272 | 6/1981 | Strickman et al. | 521/110 |
| 4,343,910 | 8/1982 | Busch, Jr. et al. | 521/82 |
| 4,548,954 | 10/1985 | Smith et al. | 521/52 |

FOREIGN PATENT DOCUMENTS 2015972 4/1970 France.

Primary Examiner—Morton Foelak
Attorney, Agent, or Firm—Merchant, Gould, Smith, Edell, Welter & Schmidt

[57] ABSTRACT

A dry-type textile cleaning article is disclosed which comprises a friable hydrophilic polyurethane foam body which incorporates abrasive particles, solvents, surfactants, and adjuvants such as fragrance, biocides, and fiber emollients. When rubbed over a textile surface the foam body yields shreds which are effective to remove both liquid and dry soils from textiles.

21 Claims, 1 Drawing Figure

FRIABLE FOAM TEXTILE CLEANING STICK

CROSS REFERENCE TO RELATED APPLICATIONS

This application is a continuation-in-part of U.S. application Ser. No. 684,384, filed Dec. 20, 1984, now U.S. Pat. No. 4,548,954 and a continuation-in-part of U.S. application Ser. No. 684,746, filed Dec. 20, 1984, both of which are continuations-in-part of U.S. application Ser. No. 511,185, filed July 6, 1983, now U.S. Pat. No. 4,563,483.

BACKGROUND OF THE INVENTION

A variety of chemical compositions intended primarily for the cleaning of limited areas of soiled textiles are available. These "spot cleaning" compositions are either liquids or suspensions of absorbent solids. For example, organic solvents or foamable water-based surfactant systems can be directly dispensed onto soiled carpetry, upholstery, clothing and the like. Alternatively, suspensions of solids in solvents can be sprayed or daubed onto spill areas. For example, French Pat. No. 2015972 discloses the application of a mixture of pulverized synthetic foam and water-alcohol to furniture textiles. When the foam has dried, it is removed from the fabric, as by vacuuming.

In order to loosen or disperse the soil, all of these compositions require that the textiles be wetted. This is disadvantageous in that a portion of the soil is driven deeper into the textile fibers. Furthermore, the use of such compositions requires either active or passive textile drying by the user, during which time the treated article cannot be used.

Finally, cleaning compositions which include substantial amounts of water or other solvent systems are ineffective to remove liquid soils.

Therefore a need exists for a dry-type cleaner which can effectively remove wet and dry soils from a wide variety of textile surfaces. A further need exists for a textile cleaner which can be effectively applied to small spill areas without wetting the textile fibers.

SUMMARY OF THE INVENTION

The present invention is directed to an article of manufacture comprising an oil and water-absorbent textile cleaning stick. The cleaning stick comprises a shaped body of a friable, hydrophilic polyurethane foam. The foam incorporates an aqueous phase and abrasive particles coupled within the cell walls of the foam matrix. This interior aqueous phase can also incorporate adjuvants including surfactants, fiber emollients, grease-cutting solvents, enzymes and the like.

When rubbed over a textile, as by hand, the contact surface of the foam body removes the soil without significantly wetting the textile fibers, and crumbles into particles which are subsequently disposed of. Thus, the present device functions as an eraser which constantly sheds foam particles into which soil has been absorbed, exposing a fresh surface to the soiled textile as it is used.

Furthermore, the present cleaner is effective on both dry and wet textiles. On dry fabrics the foam exhibits a high affinity for particulate soil. When contacted with the textile surface, effective amounts of cleaning, conditioning and odoriferous agents can be transferred from the foam matrix to the fibers via partial release of the entrapped aqueous carrier phase, which is then reabsorbed.

On damp or wet carpeting, the hydrophilic foam strongly absorbs the aqueous soil by the wicking action of the connecting passages of the foam matrix, thus cleaning and drying the textile fibers. Even when loaded to capacity with water, the resultant foam shreds retain their structural integrity and can be readily removed from the textile surface by vacuuming or sweeping.

The present textile cleaning foams are prepared by foaming a polyurethane prepolymer resin which contains at least two free isocyanate groups per resin molecule (e.g., about 1.3–2.5 mEq/g of NCO) with an aqueous reactant phase comprising a slurry of solid abrasive particles. The solid particles will also have been pretreated with a silane-coupling agent which functions to bind the particles into the polyurethane foam matrix. Although polyurethane foams useful in the present invention may be foamed from aqueous slurries which comprise up to about 80% by weight of the silane-treated particles, an amount of abrasive equal to about 40–70% of the total slurry weight is preferred, since this range of particles resists separation from the polymeric matrix, while imparting effective scouring power to the cleaning composition. The aqueous slurry of abrasive particles is combined with the prepolymer resin so that the final mole ratio of water to the total free isocyanate groups on the prepolymer molecules is within the range of about 5–200:1. These amounts of water react with the free isocyanate groups to release carbon dioxide which blows the prepolymer into a cross-linked, open-celled foam which is rendered hydrophilic by entrapment of excess water in the cell walls of the foam matrix. When the prepolymer-slurry mixture is allowed to set in molds, a dense, friable foam body of the desired shape is formed.

The water in excess of that required to foam the resin is entrapped within the cell walls of the foam. The substantially integral incorporation of this interior aqueous phase into the foam matrix leaves the open cellular voids largely clear the available to absorb liquid soils. The aqueous phase also functions as a carrier for a wide variety of cleaning, conditioning and deodorizing agents. Such agents include surfactants, solvents, enzymes, biocides, fragrances, fiber emollients and the like. The use of an aqueous cleaning conditioning and-/or deodorizing phase to foam the pre-polymer resin also eliminates the need to post-add water and other cleaning liquids to the pre-formed foams.

For example, the cleaning activity of the present foams is enhanced by incorporating an effective amount of one or more surfactants and an organic solvent in the aqueous phase used to form the foams.

The surfactant can act both to disperse the organic solvent in the interior aqueous phase as well as to disperse the oily or greasy soils, which are then absorbed by the foam. The organic solvent also helps to dissolve and remove the soil.

DETAILED DESCRIPTION OF THE INVENTION

Figure 1:
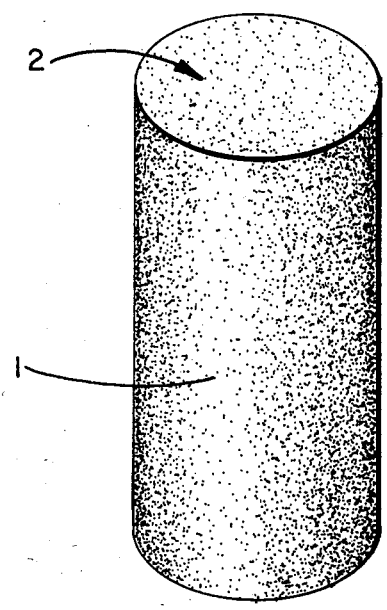

The textile cleaning sticks of the present invention are prepared by a process comprising forming an aqueous slurry which includes solid abrasive particles which have been treated with a silane-coupling agent. The slurry further includes an amount of surfactant effective to form an open-celled foam upon reaction of the aqueous phase with a water-foamable polyurethane prepolymer resin. The surfactant also can function to disperse or dissolve organic solvents in the aqueous phase, which can assist in removing oily or greasy soils.

The aqueous phase may further comprise a suspending agent and additional foam-forming and structuring agents such as silicone fluids, additional surfactants, and the like which also can act to build the cleaning and conditioning power of the finished composition. The fully-formed aqueous slurry is then combined with a water-foamable prepolymer resin and the reaction mixture allowed to foam and cure to form a self-cross-linked, open-celled, friable polyurethane body. The foam may be cured to the desired final shape in an appropriately-formed mold, or may be cut into the end-use configuration from a larger body.

PREPOLYMER RESINS

A commercially available class of water-foamable prepolymer resins which yield cross-linked, hydrophilic polyurethane foams upon the addition of stoichiometric excesses of water are those belonging to the Hypol® series (W. R. Grace & Co.; FHP 3000, 2000, 2000 HD, 2002) which are generally described in U.S. Pat. No. 4,137,200, the disclosure of which is incorporated by reference herein. These liquid resins are prepared by capping mixtures of low molecular weight polyols having 3-8 hydroxyl groups and polyoxyethylene diols with toluene diisocyanate. The capped alcohol mixtures have an average number of free isocyanate groups per molecule which is equal to two or more, i.e. 2-8.

These resins possess molecular weights within the range of about 1300-1400 and have about 1.5-2.5 mEq./g. of free isocyanate groups. Upon being contacted with a molar excess of water, the isocyanate groups hydrolyze to release carbon dioxide gas, thus foaming the resin without the need for added catalysts or blowing agents. The free amino groups formed by the hydrolysis reaction react with unhydrolyzed isocyanate groups to form ureido groups which cross-link and stabilize the foam, while entrapping a part of the excess water in the cell walls, where it acts to impart hydrophilic properties to the foam. The compatibility of the foam matrix with large molar excesses of water is a necessary requirement of resins useful in the practice of the present invention, since large amounts of water are needed to uniformly introduce large amounts of abrasive material into the matrix.

Other poly-$C_2$-$C_3$-alkylenoxy glycols capped with aromatic isocyanates may be prepared which possess a suitable balance between their extent of cross-linking prior to foaming and their ability to cross-link or to further cross-link during foaming (due to the presence of more than two reactive isocyanate groups per resin molecule), so as to be useful in the practice of the present invention over the entire range of solids and surfactant content. These prepolymer resins are prepared by polymerizing ethylene oxide to yield polyalkylenoxy polyols having a molecular weight of about 900-1100. These polyols are reacted with a stoichiometric excess of a polyisocyanate. Suitable isocyanates include toluene diisocyanate, triphenylmethane-4,4',4"-triisocyanate, benzene-1,3,5-triisocyanate, hexamethylene diisocyanate, xylene diisocyanate, chlorophenylene diisocyanate and mixtures thereof. The useful resins recovered have a somewhat lower number of mEq of free isocyanate groups (NCO) per gram of resin than do the Hypol® resins, e.g. 1.3-1.5 mEq/gram and can exhibit substantially higher tensile strengths when foamed and cured at ambient temperatures to incorporate high percentages of dispersed abrasives.

Commercially available self cross-linking resins include Trepol® A-62 and TRE STD® prepolymer resin (Twin Rivers Engineering Co., East Booth Bay, ME), which form acceptable foams upon reaction with at least a stoichiometric excess of water without employing a low molecular weight polyol component to raise the average number of free isocyanate groups per glycol ether molecule to above two. TRE STD® resin has an average free isocyanate content of about 1.4 mEq./gram, comprises a polyol component having an average molecular weight of about 1000, exhibits a viscosity at 32° C. of 4700 cps and solidifies at 15.5° C.

In the practice of the present invention, useful foams may be formed employing a weight ratio of water to prepolymer resin of 0.5-4:1, preferably 1-3.5:1, most preferably about 2-3.25:1. These ranges mole ratios of water to free isocyanate groups of about 20-150:1, preferably about 30-135:1.

PARTICULATE ABRASIVE

Particulate abrasive solids are employed as components of the present foams and are dispersed and bound throughout the foam matrix by silane-coupling agents as described below. The choice of abrasive material may be made from a wide variety of materials of adequate hardness and of a particle size range which will enable them to effectively clean soiled textile fibers without cutting or unduly abrading them. The abrasive solids can comprise about 40-70% by weight of the aqueous reactant phase, preferably about 45-65%. These large amounts of abrasive material also increase the friability of the foam. The weight ratio of abrasive to prepolymer which may be used is limited only by the ability of the foamed polymeric matrix to retain the abrasive particles without undue loss of tensile strength or separation and loss of the solid during preparation, shipping or use. Preferably, the weight ratio of the abrasive to the prepolymer will be about 20-3:1. Therefore, on a dry weight basis the present foams will include about 50-90%, preferably about 60-80% by weight of abrasives.

Due to the use of a silane-coupling agent to bind the preferred amounts of abrasive particles to the foam matrix, abrasive particles are preferably chosen from those substances which possess sufficient free surface Si—OH or Al—OH groups to form reactive sites for the silane-coupling agents. Among the substances that meet this requirement are the feldspar minerals, clays, quartz, aluminas, sands, glasses, naturally-occurring and synthetic zeolites, zircon, carborundum, pumice and the like, which may be used singly or in mixtures.

A preferred abrasive is ground feldspar (170-250 mesh) available from the Feldspar Corporation, Spruce Pine, N.C. The silane-treated abrasive solids are introduced into the present cleaning compositions as components of the aqueous reactant phase, in which they are suspended prior to the foaming reaction, as described hereinbelow.

SILANE COUPLING AGENT

The foams of the present invention will also include a minor but effective amount of a silane-coupling agent which functions to bond to the polyurethane matrix and the surface of the particles of the inorganic abrasive, thus chemically-coupling the abrasive into the polymeric matrix and preventing the abrasive particles from separating from the foam matrix during packaging or use. Silane-bound solid particles also clump less readily and so are more evenly dispersed throughout the solidifying matrix during the foaming reaction.

Useful silane-coupling agents may be selected from members of organosilicon monomers such as substituted-alkyl(trisalkoxy)silanes which can be characterized by the formula $RSiX_3$, wherein R is an organofunctional group attached to silicon in a hydrolytically stable manner and X designates hydrolyzable groups which are converted to silanol groups upon hydrolysis. Most commonly, R comprises a vinyl, methacryloxypropyl, 3,4-epoxycyclohexylethyl, 3-glycidoxypropyl, 3-mercaptopropropyl, 3-aminopropyl or 3-ureidopropyl moiety which may be further separated from the silicon group by one or two $-NH(CH_2)_n$ moieties wherein $n=1-2$. Preferably X is an alkoxy group selected from the group consisting of methoxy, ethoxy, 2-methoxyethoxy or is acetoxy. Preferred silane-coupling agents are commercially-available from Union Carbide as the A-series, e.g., A1100–A1160, which include 3-aminopropyltriethoxysilane, 3-aminopropyltrimethoxysilane (also available from Dow Corning as Z-6020), N-2-aminoethyl-3-aminopropyltrimethoxysilane, or 3-ureidopropyl-triethoxysilane.

The silane-coupling agents are reacted with the particulate abrasive by adding the silane to a stirred slurry of the abrasive in the water used to form the aqueous phase. Completion of the hydrolysis reaction can be attained by heating the slurry to at least about 25°–45° C. at which point the other components of the aqueous phase, e.g., the suspending agent, surfactants, foam structuring agents, solvents and the like may be added. When the abrasive solid particles are coated in this fashion, the free amino groups of the coupling agent bind to the polymeric chains of the substrate during the foaming step, i.e., when the aqueous reactant phase and the polyurethane prepolymer are mixed together.

SUSPENDING AGENTS

The uniform distribution of abrasive particles throughout the foam matrix is assisted by the use of a suspending ("gelling") agent which is added to the aqueous phase in an amount effective to produce a stable dispersion of the particulate abrasive. The inorganic suspending agents can also enhance the cleaning properties of the foam.

Useful inorganic agents comprise those of natural or synthetic mineral origin. Preferred gelling agents include diatomaceous earths, e.g. Celite ® (Johns Manville Corp., Denver, Col.) and the smectite clays such as the saponites and the montmorillonite colloidal clays such as Veegum ® and Van Gel ® (Vanderbilt Minerals, Murray, KY), or Magnabrite ® (American Colloid Co., Skokie, IL). Preferred synthetic silicates for use in the present invention include the hydrous calcium silicate, Micro-Cel ® and the hydrous magnesium silicate Celkate ® (Seegot, Inc., Parsippany, NJ). Inosilicates can also be used, alone or in combination with the silicates and the clays to produce open-celled foams. Preferred inosilicates are the naturally-occurring calcium meta-silicates such as wollastonite, available as the NYAD ® wollastonite series (Processed Minerals Inc., Willsboro, NY). Synthetic sodium magnesium silicate clays, hectorite clays, and fumed silicas can also be used as suspending agents.

The solid suspending agents can be introduced into the aqueous reactant phase as dry powders at any convenient time during its formation. Preferably they will be added after reaction of the particulate abrasive with the silane coupling agent. The suspending agent will be used in amounts equal to about 0.25–10%, preferably about 0.5–5% by weight of the aqueous reactant phase. When added in these amounts the suspending agent will represent about 1–3% of the total weight of the abrasive particles which are employed.

SILICONE FLUID

Silicone fluids can also be employed as foam cell initiating and structuring agents and are selected from those which function to control cell size and aid reticulation. These fluids also function to break up films or other deposits of oily or greasy soils and can function as fiber emollients.

Useful classes of silicone fluids include the linear polydimethylsiloxanes or the tetrameric or pentameric cyclic siloxanes (cyclomethiocones) which are available from Rhone-Poulenc, Inc. (Monmouth Junction, NJ) as the Rhodorsil ® fluid series in a wide range of viscosities (i.e., 10–10,000 cps.). When used as a component of the present foams, about 0.1–10%, preferably 1–5% by weight of the aqueous phase of a silicone fluid of about 0.5–150 cps viscosity, preferably about 25–100 cps, can be employed.

SURFACTANT

One or more foam-reticulating surfactants will also be incorporated into the aqueous phase. These surfactants function to remove the window membranes of the foam cells, thus producing the desired reticulated, or highly open, structure. The surfactant also functions to enhance the cleaning power of the foam by dispersing greasy dirt when the foam is brought into conact with the soiled fabric area. Foam reticulating surfactants are preferably selected from nonionic surfactants, anionic surfactants, or mixtures thereof which are soluble or dispersible in water.

Nonionic surfactants are the preferred surfactants for use in this invention. This class of surfactants includes the condensation products of ethylene oxide with a hydrophobic polyoxyalkylene base formed by the condensation of propylene oxide with propylene glycol. The hydrophobic portion of these compounds has a molecular weight sufficiently high so as to render it water-insoluble. The addition of polyoxyethylene moieties to this hydrophobic portion increases the water-solubility of the molecule as a whole, and the liquid character of the product is retained up to the point where the polyoxyethylene content is about 50% of the total weight of the condensation product. Examples of compounds of this type include certain of the commercially-available Pluronic ® surfactants (BASF Wyandotte Corp.), especially those in which the polyoxypropylene ether has a molecular weight of about 1500–3000 and the polyoxyethylene content is about 35–55% of the molecule by weight, i.e. Pluronic ® L-62.

Other useful nonionic surfactants include the condensation products of $C_8$–$C_{22}$ alkyl alcohols with 2–50 moles of ethylene oxide per mole of alcohol. Examples of compounds of this type include the condensation products of $C_{11}$–$C_{15}$ fatty alcohols with 3–50 moles of ethylene oxide per mole of alcohol which are commercially-available from Shell Chemical Co., Houston, TX as i.e., Neodol ® 23-6.5 ($C_{12}$–$C_{13}$ fatty alcohol condensed with about 7 moles of ethylene oxide), the Poly-Tergent ® SLF series from Olin Chemicals or the Tergitol ® series from Union Carbide, i.e. Tergitol ® 15-S-15, which is formed by condensing about 15 moles of ethylene oxide with a $C_{11}$-$C_{15}$ secondary alkanol; and Tergitol ® TMN-6, which is the condensation product of about 6 moles of ethylene oxide with isolauryl alcohol (CTFA name: isolaureth-6).

Other nonionic surfactants which may be employed include the ethylene oxide esters of $C_6$-$C_{12}$ alkyl phenols such as (nonylphenoxy)polyoxyethylene ether. Particularly useful are the esters prepared by condensing about 8-12 moles of ethylene oxide with nonylphenol, i.e. the Igepal ® CO series (GAF Corp., New York, NY).

Other useful nonionics include the ethylene oxide esters of alkyl mercaptans such as dodecyl mercaptan polyoxyethylene thioether, the ethylene oxide esters of fatty acids such as the lauric ester of polyethylene glycol and the lauric ester of methoxypolyethylene glycol, the ethylene oxide ethers of fatty acid amides, the condensation products of ethylene oxide with partial fatty acid esters of sorbitol such as the lauric ester of sorbitan polyethylene glycol ether, and other similar materials, wherein the mole ratio of ethylene oxide to the acid, phenol, amide or alcohol is about 5-50:1.

Useful anionic surfactants include the alkali metal salts of sulfated ethylenoxy fatty alcohols (the sodium or ammonium sulfates of the condensation products of about 1-4 moles of ethylene oxide with a $C_{12}$-$C_{15}$ n-alkanol, i.e., the Neodol ® ethoxysulfates, such as Neodol ® 25-3S, Shell Chemical Co.); anionic detergent salts having alkyl substituents of 8 to 22 carbon atoms such as the water-soluble higher fatty acid alkali metal soaps, e.g., sodium myristate and sodium palmitate. Another useful class of anionic surfactants encompasses the water-soluble sulfated and sulfonated anionic alkali metal and alkaline earth metal detergent salts containing a hydrophobic higher alkyl moiety (typically containing from about 8 to 22 carbon atoms) such as salts of higher alkyl mono or polynuclear aryl sulfonates having from about 1 to 16 carbon atoms in the alkyl group (e.g., sodium dodecylbenzenesulfonate, magnesium tridecylbenzenesulfonate, lithium or potassium pentapropylenebenzenesulfonate). These compounds are available as the Bio-Soft ® series, i.e. Bio-Soft ® D-40 (Stephan Chemical Co., Northfield, IL).

Other useful classes of anionic surfactants include the alkali metal salts of sulfonsuccinic acid esters, e.g., dioctyl sodium sulfosuccinate (Monawet ® series, Mona Industries, Inc., Paterson, NJ); the alkali metal salts of alkyl naphthalene sulfonic acids (methyl naphthalene sodium sulfonate, Petro ® AA, Petrochemical Corporation); sulfated higher fatty acid monoglycerides such as the sodium salt of the sulfated monoglyceride of coconut oil fatty acids and the potassium salt of the sulfated monoglyceride of tallow fatty acids; alkali metal salts of sulfated fatty alcohols containing from about 10 to 18 carbon atoms (e.g., sodium lauryl sulfate and sodium stearyl sulfate); sodium $C_{14}$-$C_{16}$-alpha-olefin sulfonates such as the Bio-Terge ® series (Stephan Chemical Co.); alkali metal salts of higher fatty esters of low molecular weight alkylol sulfonic acids, e.g., fatty acid esters of the sodium salt of isethionic acid; the fatty ethanolamide sulfates; the fatty acid amides of amino alkyl sulfonic acids, e.g. lauric acid amide of taurine; as well as numerous other anionic organic surface active agents such as sodium xylene sulfonate, sodium naphthalene sulfonate, sodium toluene sulfonate and mixtures thereof.

A further useful class of anionic surfactants includes the 8-(4-n-alkyl-2-cyclohexenyl)-octanoic acids wherein the cyclohexenyl ring is substituted with an additional carboxylic acid group. These compounds, or their potassium salts, are commercially-available from Westvaco Corporation as Diacid ® 1550 or H-240.

In general these organic surface active agents are employed in the form of their alkali metal salts, ammonium or alkaline earth metal salts as these salts possess the requisite stability, solubility, and low cost essential to practical utility.

The total amount of nonionic and/or anionic surfactant which is incorporated into the present foams is preferably about 0.5-10%, most preferably 1-5% by weight of the aqueous phase.

SOLVENT

About 1-20% by weight of the aqueous phase can also consist of an organic solvent such as kerosene, isoparaffins, mineral spirits, low viscosity mineral oils, lower alkanols, butyl carbitol, alkyl cellusolves, or a similar aromatic or aliphatic solvent or solvent mixture, which effectively assists the solubilization and removal of greasy and oily deposits. Preferably, the foams will comprise about 5-25% solvent on a dry weight basis.

Preferred solvents include mineral spirits, low molecular weight mineral oils (ca. 25-45 SUS viscosity at 100° F.) and $C_{10}$-$C_{14}$ isoparaffins, e.g., the Isopar ® series, available from Exxon Co., Houston, TX.

ENZYME

The present textile cleaners can also incorporate an effective amount of one or more enzymes to increase the ability of the present cleaners to degrade and remove organic soils such as food spills, excreta, grass stains and the like. Useful enzymes include those commonly included in solid or liquid detergent compositions formulated for clothes washing, warewashing and spot removal applications. These enzymes can include proteases, amylases and/or lipases such as alkaline proteases, neutral proteases, acid proteases and alpha-amylases.

Proteases attack proteins and convert them into more soluble polypeptides and amino acids. Amylases degrade carbohydrates such as starches into soluble sugars and dextrins. Lipase attacks natural fats and oils.

Preferred enzymes for use in the present cleaners include the alkaline proteases such as BPN', keratinase, subtilisin, carboxypepsidase, amino peptidase and the aspergiollopeptidases (A and B). Neutral proteases which can be used herein include chymotrypsin and trypsin. Useful acid proteases include pepsin, papain and bromelin. Many of these enzymes are commercially-available as powders or stabilized solutions of standardized activity. Specific examples of commercially-available enzyme preparations useful for cleaning application are disclosed in U.S. Pat. Nos. 3,557,002; 3,781,212 and 4,404,155, the disclosures of which are incorporated by reference herein.

The amount of any given enzyme or enzyme mixture incorporated into the present foams will depend on a variety of factors, including target soil, and enzyme activity, solubility and stability. Preferably, weight percent of enzymes introduced into the aqueous reactant phase may vary from 0.001-5%, preferably from 0.01-2.5%.

Minor but effective amounts of an odoriferous or deodorant agent selected so as to be chemically-compatible with the above-described surfactants are preferably introduced into the present foams, e.g. by inclusion in the aqueous phase. Useful fragrances will include, for instance, about 0.025-2%, preferably about 0.05-1.5% of floral oils such as rose oil, lavender, lilac, jasmine, wisteria, lemon, apple blossom, or compound bouquets such as spice, pine, aldehydric, woody, oriental, and the like.

Minor amounts of other foam-compatible adjuvants, such as dyes, biocides (preservatives and/or disinfectants) and the like, may be introduced into the present foam products in effective amounts via the aqueous reactant or resin phase. When employed in the present products, such adjuvants can be present at levels of up to about 5-10% by weight of the finished product.

Therefore, useful aqueous reactant phases can comprise about 15-40% water, preferably about 20-30% water; about 45-60% by weight of abrasive particles which have been surface-treated with about 0.1-5% by weight of the abrasive of a silane-coupling agent, about 0.5-5.0% by weight of a mixture of one or more, preferably two, nonionic surfactants and about 5-15% an organic solvent, optionally in admixture with about 1-10% of a silicone fluid, about 0.5-2% of a suspending (gelling) agent, 0.1-2% of an enzyme, and minor amounts of dye and/or fragrance and/or preservative.

PREPARATION

The foam products of the present invention are formed by mixing and foaming the prepolymer resin with the aqueous reactant phase in a weight ratio of aqueous reactant phase to prepolyer resin of about 7.5-15:1, preferably about 10-15:1.

In a typical procedure, a slurry is formed of water and the abrasive particles which is then treated with the silane-coupling agent with stirring and heating sufficient to surface-coat the abrasive with the silane. The suspending agent is then added portion-wise. The surfactants, the silicone fluid, the fragrance, the preservative, and the solvent, are then added to the stirred slurry.

The stirred aqueous reactant phase is brought to about 15°-45° C. and blended in the desired weight ratio with the heated (25°-43° C.) prepolymer resin, e.g. in the mixing chamber of a foam-spraying machine. The foaming, exothermic mixture is sprayed into open or closed foams and allowed to set at ambient temperatures.

The cured foam bodies formed by this process may be shaped as desired, e.g. into blocks, rods and the like. These bodies are of relatively high density (i.e., about 0.2-0.6 g/cc) but have a much lower tensile strength than is normally desirable or obtained for other polyurethane-type foams. Polyurethane foams which have been formulated so as to retain their integrity during use as, for example, sponges, abrasive pads, padding and the like typically exhibit tensile strengths of about 30-60 lbs. as measured by standard ASTM methods (D-1682, one inch cut strip method) whereas the friable foam bodies of the present invention have tensile strengths of less than about 2.0 lb., preferably less than 1.5 lb., most preferably less than 1.0 lb. (453 g), i.e., 0.25-1.0 lb. These low tensile strengths cause the foam bodies to crumble when they are rubbed against a textile surface under conditions of moderate pressure, e.g. manually. As they disperse and absorb soil, the solid foam bodies shed foam shreds to continuously expose a fresh contact surface. The shreds are removed from the spill area, as by vacuuming or sweeping, and disposed of.

The invention will be further described by reference to the following detailed examples.

EXAMPLE I

A one liter beaker equipped with mechanical stirring was charged with 267.2 g of water and 528.1 g of 200 mesh feldspar powder was added with rapid stirring, followed by slow addition of 2.5 g of the aminosilane ester coupling agent (Union Carbide A-1120). The mixture was heated to 30° C. with continued agitation for 20 min. The suspending agent (11.2 g, Micro-Cel ® E) was slowly sifted into the slurry, which was then sequentially treated with 16.9 g Pluronic ® L-62 nonionic surfactant, 28.1 g Dow 200 silicone fluid (50 cps.), 2.3 g of Nuosept ® 95 preservative (Nuodex, Inc., Piscataway, NJ), 3.3 fragrance and 112.3 g of $C_{11}$-$C_{12}$ isoparaffin solvent (Isopar ® K).

After 30 min. of vigorous stirring, an 89.3 g portion of the resultant aqueous reactant phase was cooled to 25° C. and combined with 2.81 g of Tergitol ® 15-S-15 nonionic surfactant. The prepolymer resin (TRE A-62 7.91 g) which had been warmed to 38° C. was then mixed into the aqueous phase.

The composition of this mixture is summarized in Table I, below.

TABLE I

| Ingredient | Percent in Mixture | Composition of Aqueous Phase (%) |
|---|---|---|
| Water | 24.6 | 26.7 |
| Micro-Cel ® E | 1.0 | 1.1 |
| Feldspar | 48.6 | 52.8 |
| Dow 200 Fluid | 2.6 | 2.8 |
| A-1120 Silane | 0.2 | 0.2 |
| Isopar ® K Solvent | 10.3 | 11.2 |
| Pluronic ® L-62 | 1.6 | 1.7 |
| Tergitol ® 15-S-15 (60% actives)* | 2.6 | 2.8 |
| Nuosept ® 95 | 0.3 | 0.3 |
| Fragrance | 0.3 | 0.4 |
| TRE A-62 Prepolymer | 7.9 | — |
| | 100.0% | 100.0% |

*Neodol ® 25-3S also performed satisfactorily.

The foaming mixture was poured into 5.6×20 cm cylindrical molds and allowed to free rise and cure. After curing, the solid foam was sliced into cylindrical bodies of varying lengths. The cured foam was friable, substantially open-celled and highly reticulated. The foam exhibited a breaking (tensile) strength of 0.37 lb. with a 30-31% elongation at break (ASTMD-1682, 2.54 cm cut strip method).

The cleaning stick of Example I crumbled readily when manually rubbed over carpeting. For example, a cleaning stick preparing according to Example I in a cylindrical mold 7 cm in diameter yielded 4.1 g of shreds when manually rubbed fifty times over short-pile, looped nylon carpeting, and did not wet the user's hand during use.

FIG. 1 is a perspective, scale view of the cleaning device (1) prepared according to Example I. The flexible foam body can also be partially enclosed in a rigid cylindrical casing, e.g. of the push-up type (not shown), in order to provide lateral support while exposing the working surface (2) of the foam body.

Table II summarizes the friability of a number of open-celled foam cleaning sticks prepared according to Example I, but employing an equivalent amount of the listed surfactant in place of Tergitol® 15-S-15. The cylindrical sticks had a working surface 7 cm in diameter and were tested manually on nylon carpet as described hereinabove.

TABLE II

SURFACTANT STUDY

| Example | Surfactant | Friability (g/50 strokes) |
|---|---|---|
| IA | Tergitol® TMN 6 | 2.50 g |
| IB | Tergitol® TMN 10 | 3.22 g |
| IC | Tergitol® 15-S-30 | 3.29 g |
| ID | Tergitol® 15-S-40 | 5.87 g |

Replacement of Tergitol® 15-S-15 with the nonionic surfactants listed on Table II yielded cleaning sticks which exhibited satisfactory friability, e.g., between 2–6 g of shreds/50 strokes, for use in manual textile cleaning at the given working face diameter. The apparent friability of a given foam can be reduced by increasing the area of the working surface of the stick, and a low friability value can be increased by reducing the working area of the cleaner. Thus, foams exhibiting friabilities as low as 0.1–0.3 g for working areas of 7 cm in diameter may perform satisfactorily when formulated as thin cleaning "crayons," for the removal of small spots. Likewise, foams having friabilities of about 5–8 g for the 7 cm foam cylinders may be satisfactory when employed in cleaners having greater working surface areas, such as in blocks or pads.

In a controlled cleaning study, sections of a short-medium pile light beige-colored nylon carpet were treated with three types of greasy/particulate soils: (1) used automotive motor oil, (2) a mixture of Crisco® vegetable oil shortening, butter and corn oil darkened with lampblack, and (3) blended grease scrapings from a restaurant grill. Each type of soil was applied uniformly to four equal areas of carpeting. Three of the areas were cleaned and one area was employed as an untreated control. The stained areas were allowed to stand for 18 hrs under ambient conditions prior to cleaning.

The cleaning sticks of Examples I (Tergitol® 15-S-15), IB and ID were evaluated by hand rubbing them over a given stain area, alternating clockwise and counterclockwise rubbing after each ten strokes. Using a Photovolt Reflectometer, measurements were taken initially and after 60 and 180 cleaning strokes. A laboratory panel of 18 individuals rated the percent stain removal after these cleaning intervals. The quantitative and qualitative data obtained from these evaluations are summarized in Tables III–V, below.

TABLE III

AVERAGE PERCENT STAIN REMOVED AFTER 60 STROKES*

| Stick of Example | Soil-Type | | |
|---|---|---|---|
| | Motor Oil | Grill Grease | Fat/Oil Mix |
| IB | 38 (24) | 77 (65) | 49 (34) |
| I | 46 (27) | 77 (58) | 50 (36) |
| ID | 40 (29) | 75 (60) | 45 (34) |

*Numbers in (.) represent results measured via Reflectometer. Other numbers generated via panel evaluation.

TABLE IV

AVERAGE PERCENT STAIN REMOVED AFTER 180 STROKES*

| Stick of Example | Motor Oil | Grill Grease | Fat/Oil Mix |
|---|---|---|---|
| IB | 80 | 96 | 80 |
| I | 85 | 97 | 80 |
| ID | 69 | 93 | 72 |

*Determined via Panel Evaluation.

Panel members were also asked to express their opinion as to whether or not the cleaning after 180 strokes was adequate. Their responses are summarized on Table V.

TABLE V

AVERAGE NUMBER OF ADEQUATE RESPONSES OUT OF 18 PANELISTS

| Stick of Example | Motor Oil | Grill Grease | Fat/Oil Mix |
|---|---|---|---|
| IB | 6 | 15 | 6 |
| I | 8 | 15 | 5 |
| ID | 1 | 12 | 1 |

It was noted that at the 60 stroke interval the reflectance reading did not always correlate with the visual ratings (Table III). For example, the stick of Ex. ID appeared to afford slightly better cleaning on the motor oil and grill grease soils, relative to the cleaning stick of Ex. I when reflectance measurements were used as the criteria. However, visually, the stick of Ex. I was higher-rated. Such results are not unexpected, and in such cases visual rating is recognized to be the more reliable method to evaluate the performance of carpet cleaning compositions.

The data summarized in Tables III–IV indicate that the percent soil removal and the qualitative evaluations of efficacy are less than totally satisfactory, except for removal of grill grease. However, used motor oil and lampblack-containing soils are recognized to be extremely difficult soils to completely remove from any fabric substrate. As such, these soils present extremes with respect to cleaning resistance and are primary useful to evaluate differences between the present cleaning compositions.

Open-celled foam cylinders (7 cm diameter working face) prepared according to Example I with the exception that the solvents listed on Table VI were substituted for the Isopar® K (an isoparaffin solvent). None of the resultant stick cleaners deposited significant solvent on the user's hand.

TABLE VI

SOLVENT LEVEL STUDY

| Solvent (% foaming composition) | Friability (g/50 strokes) |
|---|---|
| Penreco® 2251 Mineral Oil (2.5%) | 1.25 g |
| Union Oil Deodorized Mineral Spirits (5%) | 1.95 g |
| Isopar® G (10%) | 2.92 g |
| Isopar® M (10%) | 3.07 g |
| Isopar® K (5.0%) | 1.90 g |

Foam cylinders (7 cm diameter working face) were prepared according to Example I, with the exception that the type and/or amount of prepolymer resin and solvent listed on Table VII was substituted for the 7.9%

TRE-A62 polymer and the 10% Isopar ® K, respectively.

TABLE VII
RESIN STUDY

| Prepolymer Resin (%) | Level of Moisture Deposited on User's Hands | Friability (g/50 strokes) |
| --- | --- | --- |
| Hypol ® FHP 2000 (10%)* | Moderate | 0.23 g |
| Hypol ® FHP 3000 (8%)+ | Low | 2.73 g |
| Hypol ® FHP 3000 (10%)* | Low | 0.65 g |
| Hypol ® FHP 3000 (8%)* | Low | 1.50 g |
| TRE A-62 (11%)* | None | 0.77 g |
| TRE A-62 (9%)* | None | 2.67 g |
| TRE A-62 (8%)+ | None | 7.67 g |

*Penreco 2251 Mineral Oil solvent
+Union Oil Deodorized Mineral Spirits solvent.

The data on Table VII indicate that the friability decreases with increasing prepolymer resin level. TRE A-62-type resins are somewhat preferred over Hypol ®-type resins since they yield more open foams which exhibit greater friability.

The textile cleaning sticks represented by the compositions summarized on Tables VI-VII perform satisfactorily to remove wet, oily and dry soils from a variety of textiles.

The invention has been described with reference to various specific and preferred embodiments and techniques. However, it should be understood that many variations and modifications may be made while remaining within the spirit and scope of the invention.

What is claimed is:

1. A textile cleaning stick having a tensile strength of less than about 1. lb comprising a friable open celled reticulated hydrophillic polyurethane foam matrix, wherein said matrix integrally incorporating (a) abrasive particles silane-coupled within said matrix and (b) an aqueous phase incorporating an effective amount of an organic solvent dispersed therein, so that said foam matrix yields oil and water absorbent shreds when it is rubbed across a textile surface.

2. The cleaning stick of claim 1 wherein said matrix incorporates about 50-90% of abrasive particles on a dry weight basis.

3. The cleaning stick of claim 1 wherein the organic solvent is dispersed in the aqueous phase by a nonionic surfactant.

4. The cleaning stick of claim 1 wherein said matrix further incorporates particles of an inorganic dispersing agent.

5. The cleaning stick of claim 1 wherein the aqueous phase further includes a silicone fluid.

6. The cleaning stick of claim 1 wherein the aqueous phase includes an odoriferous agent.

7. The cleaning stick of claim 1 wherein the aqueous phase further includes a protease.

8. An oil and water absorbent textile cleaning stick having a tensile strength of less than about 2.0 lbs prepared by a process comprising:
   (a) forming an aqueous reactant phase comprising about 40-70% by weight of abrasive solid particles, about 0.1-5% of the weight of the solid particles of a silane-coupling agent, about 0.1-10% of a nonionic surfactant, about 1-20% of an organic solvent and about 15-40% water;
   (b) mixing said aqueous reactant phase with a water-foamable prepolymer resin which contains at least 2 free isocyanate groups per resin molecule so that the final mole ratio of water to total free isocyanate groups is within the range of about 5-200:1, thereby converting said resin into a friable, open-celled, reticulated polyurethane foam body.

9. The cleaning stick of claim 8 wherein the weight ratio of the aqueous phase to the prepolymer resin is about 7.5-15:1.

10. The cleaning stick of claim 8 wherein the aqueous reactant phase further incorporates about 1-10% by weight of a silicone fluid.

11. The cleaning stick of claim 8 wherein the aqueous reactant phase further comprises about 0.025-2% of fragrance.

12. The cleaning stick of claim 8 wherein the aqueous phase further comprises about 0.25-10% of an inorganic suspending agent.

13. The cleaning stick of claim 8 wherein the aqueous phase further comprises about 0.1-2% of an alkaline protease.

14. The cleaning stick of claim 8 wherein said aqueous reactant phase is formed by slurrying the solid particles with the water, adding the silane-coupling agent, stirring and heating the water phase to surface-coat the abrasive with the silane and adding the surfactant and the solvent.

15. The cleaning stick of claim 14 wherein the solid particles comprise silaceous mineral particles and said silane coupling agent is an aminoalkyl(tris-alkoxy)silane.

16. A textile cleaning stick having a tensile strength of less than about 1. lb prepared by a process comprising:
   (a) forming an aqueous reactant phase comprising about 20-30% by weight of water, about 0.5-5.0% of a nonionic surfactant, about 1-10% by weight of a polydimethylsiloxane silicone fluid, about 5-15% of an organic solvent, about 45-60% of abrasive mineral particles, about 0.1-5% by weight of the mineral particles of a silane-coupling agent and about 0.5-2% of an inorganic suspending agent;
   (b) mixing said aqueous reactant phase with a water-foamable prepolymer resin in a weight ratio of aqueous phase to prepolymer of about 7.5-15:1, said prepolymer resin comprising a toluene diisocyanate-capped polyalkylenoxy ether comprising about 1.3-2.5 mEq/g of isocyanate groups, so as to convert such resin into a hydrophilic, open-celled reticulated, friable polyurethane foam body.

17. The cleaning stick of claim 16 wherein the nonionic surfactant comprises the condensation product of ethylene oxide with a polyoxypropylene ether having a molecular weight of about 1500-3000.

18. The cleaning stick of claim 16 wherein the nonionic surfactant comprises the condensation product of about 3-50 moles of ethylene oxide with a $C_{11}$-$C_{15}$ fatty alcohol.

19. The cleaning stick of claim 16 wherein the weight range of aqueous phase to prepolymer resin is about 10-15:1.

20. The cleaning stick of claim 16 wherein the organic solvent comprises mineral spirits or a low molecular weight mineral oil.

21. A method for cleaning a solid textile which comprises rubbing the cleaning stick of claims 1, 8 or 16 over the surface of said soiled textile.

* * * * *

UNITED STATES PATENT AND TRADEMARK OFFICE
CERTIFICATE OF CORRECTION

PATENT NO.  : 4,594,362
DATED       : June 10, 1986
INVENTOR(S) : James A. Smith and Betty J. Murphy It is certified that error appears in the above-identified patent and that said Letters Patent is hereby corrected as shown below:

On the front page, below "[73]" insert --[*] Notice: The portion of the term of this patent subsequent to October 22, 2002 has been disclaimed--.

At Column 4, line 66, for "to bond to the", read --to bond to both the--.

At Column 9, line 9, for "aldehydric", read --aldehydic--.

Signed and Sealed this

Eleventh Day of November, 1986

Attest:

DONALD J. QUIGG

Attesting Officer      Commissioner of Patents and Trademarks